(12) United States Patent
Jost et al.

(10) Patent No.: US 11,330,428 B2
(45) Date of Patent: May 10, 2022

(54) PRIVACY KEY IN A WIRELESS COMMUNICATION SYSTEM

(71) Applicant: Telefonaktiebolaget LM Ericsson (publ), Stockholm (SE)

(72) Inventors: Christine Jost, Lund (SE); Peter Hedman, Helsingborg (SE); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 382 days.

(21) Appl. No.: 16/610,549

(22) PCT Filed: Feb. 23, 2018

(86) PCT No.: PCT/EP2018/054560
§ 371 (c)(1),
(2) Date: Nov. 4, 2019

(87) PCT Pub. No.: WO2018/206170
PCT Pub. Date: Nov. 15, 2018

(65) Prior Publication Data
US 2021/0204118 A1    Jul. 1, 2021

Related U.S. Application Data

(60) Provisional application No. 62/503,112, filed on May 8, 2017.

(51) Int. Cl.
*H04W 12/037* (2021.01)
*H04L 29/12* (2006.01)
(Continued)

(52) U.S. Cl.
CPC ....... *H04W 12/037* (2021.01); *H04L 61/6054* (2013.01); *H04W 12/0431* (2021.01); *H04W 12/72* (2021.01); *H04W 60/00* (2013.01)

(58) Field of Classification Search
CPC .......... H04W 12/037; H04W 12/0431; H04W 60/00; H04W 12/72; H04L 61/6054
See application file for complete search history.

(56) References Cited

U.S. PATENT DOCUMENTS 8,705,743 B2 * 4/2014 Howard .............. H04L 63/0428
380/277
9,591,460 B2 * 3/2017 Anchan ............... H04W 74/006
(Continued)

OTHER PUBLICATIONS

Ginzboorg, Philip, et al., "Privacy of the long-term identities in cellular networks", Jun. 18-20, 2016, pp. 167-175.
(Continued)

*Primary Examiner* — Viral S Lakhia
(74) *Attorney, Agent, or Firm* — Murphy, Bilak & Homiller, PLLC (57) ABSTRACT

Core network equipment (20) in a wireless communication system transmits control plane signaling (22) to a user equipment (16) which receives that control plane signaling (22). The control plane signaling (22) indicates a privacy key (24) with which a subscriber identifier (e.g., an international mobile subscriber identity, IMSI) associated with the user equipment (16) is to be encrypted or decrypted. The control plane signaling (22) may be non-access stratum, NAS, signaling. The privacy key (24) may be a public key of a home network associated with the subscriber identifier.

12 Claims, 8 Drawing Sheets

(51) Int. Cl.
 *H04W 12/72* (2021.01)
 *H04W 12/0431* (2021.01)
 *H04L 101/654* (2022.01)
 *H04W 60/00* (2009.01)

(56) References Cited

U.S. PATENT DOCUMENTS

| | | | |
|---|---|---|---|
| 9,648,515 B2* | 5/2017 | Velev | H04W 28/12 |
| 9,992,670 B2* | 6/2018 | Pudney | H04W 12/04 |
| 10,382,206 B2* | 8/2019 | Muhanna | H04L 63/0428 |
| 10,455,414 B2* | 10/2019 | Lee | H04W 12/04 |
| 10,470,042 B2* | 11/2019 | Nair | H04W 60/00 |
| 10,637,835 B2* | 4/2020 | Lee | H04L 9/14 |
| 10,694,552 B2* | 6/2020 | Feng | H04W 72/04 |
| 11,160,072 B2* | 10/2021 | Golitschek Edler Von Elbwart | H04L 5/0092 |
| 2003/0072450 A1 | 4/2003 | Maggenti | |
| 2019/0182639 A1* | 6/2019 | Basu Mallick | H04W 72/10 |
| 2020/0029211 A1* | 1/2020 | Laselva | H04W 24/08 |
| 2020/0145211 A1* | 5/2020 | Lee | H04L 9/3073 |

OTHER PUBLICATIONS

Unknown, Author, "3rd Generation Partnership Project; Technical Specification Group Services and System Aspects; Procedures for the 5G System; Stage 2 (Release 15)", 3GPP TS 23.502 V0.3.0, Mar. 2017, pp. 1-115.

Unknown, Author, "3rd Generation Partnership Project; Technical Specification Group Services and System Aspects; Study on the security aspects of the next generation system (Release 14)", 3GPP TR 33.899 V1.1.0, Mar. 2017, pp. 1-491.

Unknown, Author, "Updating solution #7.3", 3GPP TSG-SA3 Meeting #85, Santa Cruz de Tenerife, Spain, Revision of S3-16xyz, Nov. 7-11, 2016, pp. 1-6.

* cited by examiner

PRIVACY KEY IN A WIRELESS COMMUNICATION SYSTEM

RELATED APPLICATIONS

This application claims priority to U.S. Provisional Patent Application Ser. No. 62/503,112, filed May 8, 2017, the entire contents of which are incorporated herein by reference.

TECHNICAL FIELD

The present application relates generally to a wireless communication system, and relates more specifically to privacy in a wireless communication system.

BACKGROUND

A subscriber identifier in a wireless communication system identifies an individual subscriber associated with a wireless device. The subscriber identifier may be used for any number of procedures which require identifying an individual subscriber on the air interface. For example, the device may include a subscriber identifier in a registration message when registering with the network, or a network may include the subscriber identifier within a paging message in order to page the device associated with the subscriber.

To protect against eavesdroppers identifying and tracking the subscriber on the radio interface, though, a subscriber identifier that is only temporarily assigned to the subscriber may be used instead of a subscriber identifier that is assigned to the subscriber for a longer term. In Long Term Evolution (LTE) systems, for example, the serving network may assign a Temporary Mobile Subscriber Identity (TMSI) to the subscriber and include that TMSI in a paging message for the subscriber, rather than including the International Mobile Subscriber Identity (IMSI) assigned by the subscriber's home network for a longer term.

Under some circumstances, though, a temporarily assigned subscriber identifier may not be available or otherwise usable, e.g., upon initial registration. Moreover, even if a temporary subscriber identifier is used, opportunities may still exist for eavesdroppers to track the subscriber. Known approaches may therefore still expose a subscriber to attacks on his or her privacy.

SUMMARY

According to one or more embodiments herein, control plane signaling from core network equipment to a user equipment indicates a privacy key with which a subscriber identifier associated with the user equipment (e.g., IMSI) is to be encrypted or decrypted. The control plane signaling may for instance be non-access stratum (NAS) signaling, e.g., in the form of a registration accept message or a configuration update message. The control plane signaling may be integrity protected and/or ciphered, e.g., using a key of a security context between the user equipment and the core network equipment. In these and other embodiments, therefore, the privacy key may be securely transferred by exploiting a security context that has already been established for the control plane signaling. That is, the control plane signaling (e.g., NAS messages) are effectively re-used or piggybacked onto for securely transferring the privacy key over the air. With the privacy key securely transferred in this way, the privacy key can be used to effectively conceal the subscriber identifier associated with the user equipment and thereby protect the subscriber's privacy, e.g., under at least some circumstances not possible heretofore.

More particularly, embodiments herein include a method performed by core network equipment in a wireless communication system. The method may comprise transmitting from core network equipment to a user equipment control plane signaling indicating a privacy key with which a subscriber identifier associated with the user equipment is to be encrypted or decrypted.

Embodiments also include a method performed by a user equipment in a wireless communication system. The method comprises receiving at the user equipment, from core network equipment, control plane signaling indicating a privacy key with which a subscriber identifier associated with the user equipment is to be encrypted or decrypted.

In some embodiments, the method by the user equipment may further comprise, in response to receiving the control plane signaling, transmitting acknowledgement information acknowledging reception of the control plane signaling.

In some embodiments, the method by the user equipment may further comprise storing the privacy key in an elementary file of an integrated circuit card or a subscriber identification module associated with the user equipment.

In any of the embodiments for the method performed by the core network equipment or the user equipment, the method may further comprise encrypting the subscriber identifier for the user equipment using the indicated privacy key and transmitting the subscriber identifier as encrypted with the indicated privacy key.

Alternatively or additionally, in any of the embodiments for the method performed by the core network equipment or the user equipment, the method may further comprise receiving the subscriber identifier as encrypted with the indicated privacy key and decrypting the subscriber identifier for the user equipment using the indicated privacy key.

In any of the embodiments, the control plane signaling may be non-access stratum (NAS) signaling.

In any of the embodiments, the privacy key may be indicated by a non-access stratum (NAS) message of the control plane signaling.

In any of the embodiments, the control plane signaling may provision the user equipment with the privacy key.

In any of the embodiments, the control plane signaling may be signaled according to a security context previously established between the user equipment and the core network equipment.

In any of the embodiments, the control plane signaling may be integrity protected and/or ciphered using a key shared between the user equipment and the core network equipment.

In any of the embodiments, the subscriber identifier may be a long-term subscriber identifier or a permanent subscriber identifier.

In any of the embodiments, the subscriber identifier may be or may be a portion of an International Mobile Subscriber Identity, IMSI. Alternatively, in any of the embodiments, the subscriber identifier may be a pseudonym identifier associated with a long-term subscriber identifier or a permanent subscriber identifier.

In any of the embodiments, the privacy key may be a public key of a home network associated with the subscriber identifier. Alternatively, in any of the embodiments, the privacy key may be a key shared between the user equipment and a home network associated with the subscriber identifier.

In any of the embodiments, the control plane signaling may be addressed to an integrated circuit card or a subscriber identification module associated with the subscriber identifier.

Embodiments also include core network equipment for use in a wireless communication system. The core network equipment is configured to transmit from the core network equipment to a user equipment control plane signaling indicating a privacy key with which a subscriber identifier associated with the user equipment is to be encrypted or decrypted. The core network equipment may be configured to perform the method of any of the above described embodiments.

Embodiments further include user equipment for use in a wireless communication system. The user equipment is configured to receive at the user equipment, from core network equipment, control plane signaling indicating a privacy key with which a subscriber identifier associated with the user equipment is to be encrypted or decrypted. The user equipment may be configured to perform the method of any of the above described embodiments.

Embodiments also include a computer program comprising instructions which, when executed by at least one processor of equipment configured for use in a wireless communication system, causes the equipment to carry out the method of any of the above described embodiments. Embodiments further include a carrier containing the computer program, wherein the carrier is one of an electronic signal, optical signal, radio signal, or computer readable storage medium.

DETAILED DESCRIPTION

Figure 1:
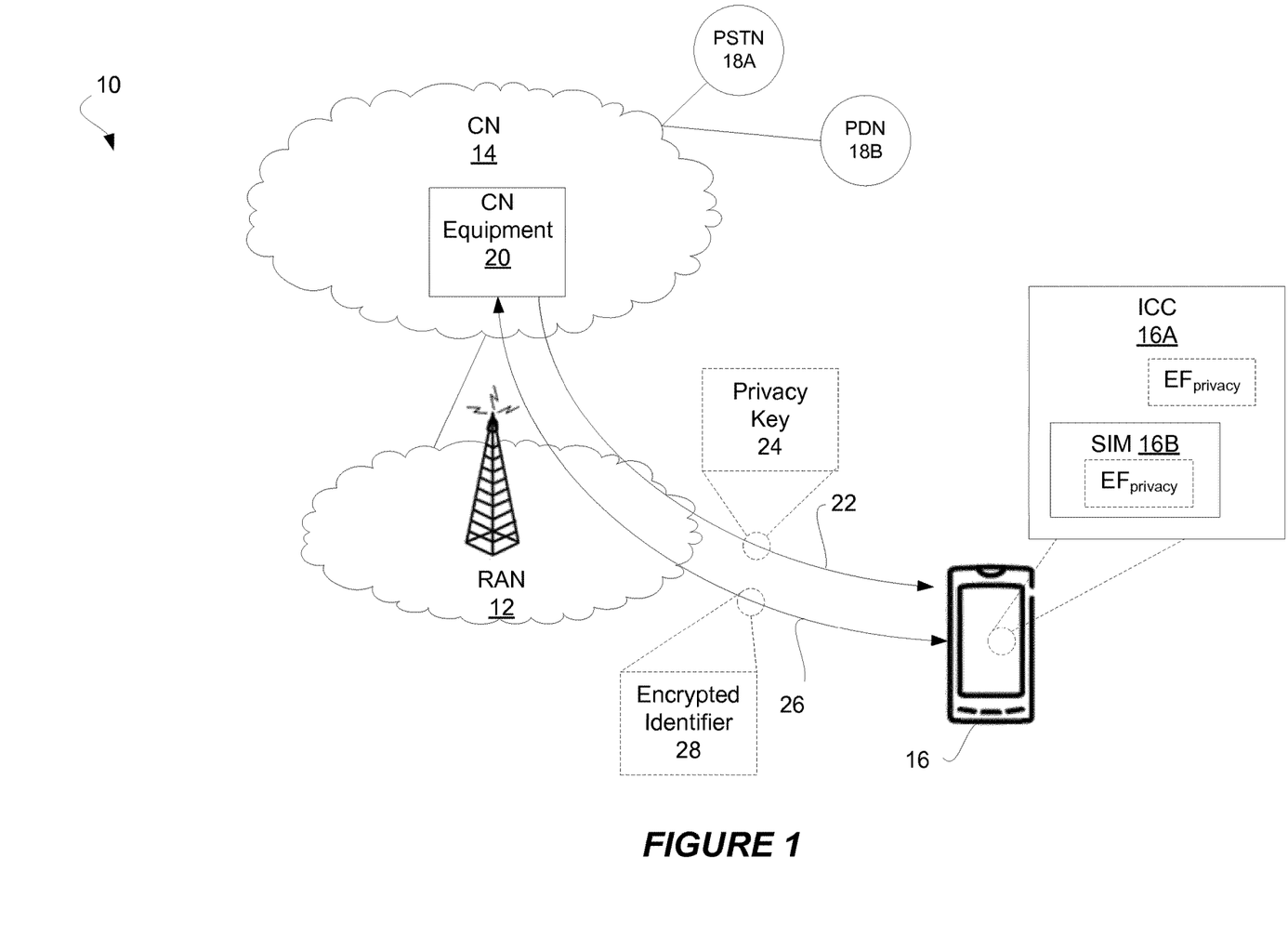
FIG. 1 is a block diagram of a wireless communication system according to some embodiments.

FIG. 1 illustrates a wireless communication system 10 according to one or more embodiments. As shown in FIG. 1, the system 10 (e.g., an LTE or 5G system) includes a radio access network (RAN) 12 and a core network (CN) 14. The RAN 12 wirelessly connects one or more user equipment 16 to the CN 14. The CN 14 in turn connects the one or more user equipment 16 to one or more external networks 18A, 18B. As shown, these one or more external networks 18A, 18B include a public switched telephone network (PSTN) 18A and a packet data network (PDN) 18B, such as the Internet.

The user equipment 16 is associated with a subscriber identifier, e.g., in the sense that the subscriber identifier identifies a subscriber which operates the user equipment. In some embodiments, the subscriber identifier is a permanent or long-term identifier, such as an international mobile subscriber identity (IMSI). In other embodiments, the subscriber identifier is a pseudonym identifier that stands as a pseudonym for the IMSI. The subscriber identifier in some embodiments may therefore be a long-term identifier, or an identifier mapped or otherwise associated with the long-term identifier.

In any event, an integrated circuit card (ICC) 16A on which a subscriber identity module (SIM) 16B executes may be inserted into or otherwise included in the user equipment 16. The ICC 16A may be for instance a universal ICC, an IP Multimedia Services ICC, an embedded ICC, or any other type of tamper-resistant secure hardware component regardless of whether or not the component is removable from the user equipment 16. The SIM 16B may be a universal SIM (USIM), an IP Multimedia Services SIM (ISIM), an embedded SIM (ESIM), etc, which may be dependent on the type of the ICC 16A. Regardless, the ICC 16A and/or SIM 16B may store the subscriber identifier, e.g., in persistent memory, in order to associate the user equipment 16 with the subscriber identifier. The subscriber identifier may be used in various procedures for signaling or otherwise communicating with the RAN 12 and/or CN 14. The subscriber identifier may therefore be signaled over the air interface with the RAN 12.

One or more embodiments herein facilitate concealing the subscriber identifier, in whole or in part. For example, where the subscriber identifier is an IMSI that includes a mobile country code (MCC), a mobile network code (MNC) and a mobile subscriber identification number (MSIN), the subscriber identifier may be concealed fully (i.e., each of the MCC, MNC, and MSIN is concealed) or may be concealed partially (e.g., the MSIN is concealed, but not the MCC or MNC).

Specifically in this regard, the CN 14 includes core network equipment 20, which may for instance implement an access and mobility function (AMF) of a 5G system. The core network equipment 20 is configured to transmit control plane signaling 22 to user equipment 16, e.g., in the form of non-access stratum (NAS) signaling. The control plane signaling 22 indicates a privacy key 24 with which the subscriber identifier associated with the user equipment 16 is to be encrypted or decrypted, in whole or in part. The privacy key 24 may be for instance a public key of a home network associated with the subscriber identifier, or a key otherwise shared between the user equipment and the home network. Regardless, with this privacy key, the user equipment 16 (or, more specifically, the ICC 16A or SIM 16B of the user equipment 16 in some embodiments) may encrypt the subscriber identifier (in whole or in part) and securely transmit the encrypted subscriber identifier 28 towards the core network 14, e.g., as part of signaling 26 for any number of procedures (e.g., tracking area update, re-registration, etc.). Alternatively or additionally, the user equipment 16 may receive the encrypted subscriber identifier 28 (e.g., as part of signaling 26 for a paging procedure) and decrypt the identifier 28 using the privacy key 24.

In some embodiments, the control plane signaling is integrity protected and/or ciphered. The control plane signaling may be integrity protected in the sense that the signaling is protected from being altered without detection, e.g., the signaling may include a hash to allow the recipient to detect signal tampering. The control plane signaling may be ciphered in the sense that the signaling is encrypted so that only the recipient will be able to read it. In any event, the control plan signaling may notably be integrity protected and/or ciphered using a key of a security context between the user equipment 16 and the core network equipment 20, where a security context refers to information stored in the user equipment 16 (or ICC 16A or SIM 16B) and the core network equipment 20 for security/authentication, including for instance cryptographic keys, user equipment security capabilities, uplink/downlink NAS count values, etc. In these and other embodiments, therefore, the privacy key 24 may be securely transferred to the user equipment 16 over the air by exploiting a security context that has already been established for the control plane signaling 22. That is, the control plane signaling 22 (e.g., NAS messages) is effectively re-used or piggybacked onto for securely transferring the privacy key 24 over the air. This advantageously secures and prevents compromise of the privacy key 24 that facilitates concealment of the subscriber identifier.

Alternatively or additionally, whether or not the privacy key 24 is provisioned over the air using control plane signaling 22 from the core network 14, some embodiments store the privacy key 24 in an elementary file ($EF_{privacy}$) of the ICC 16A or SIM 16B associated with the subscriber identifier. An elementary file in this regard refers to a set of data units or records which share the same identifier in the ICC/SIM's file structure. Unlike a master file that is at the root of the ICC/SIM's file structure hierarchy, an elementary file cannot be a parent of another file. In fact, in some embodiments where the privacy key 24 is provisioned via control plane signaling 22, the control plane signaling 22 is addressed to the ICC 16A or SIM 16B associated with the subscriber identifier.

Figure 2A:
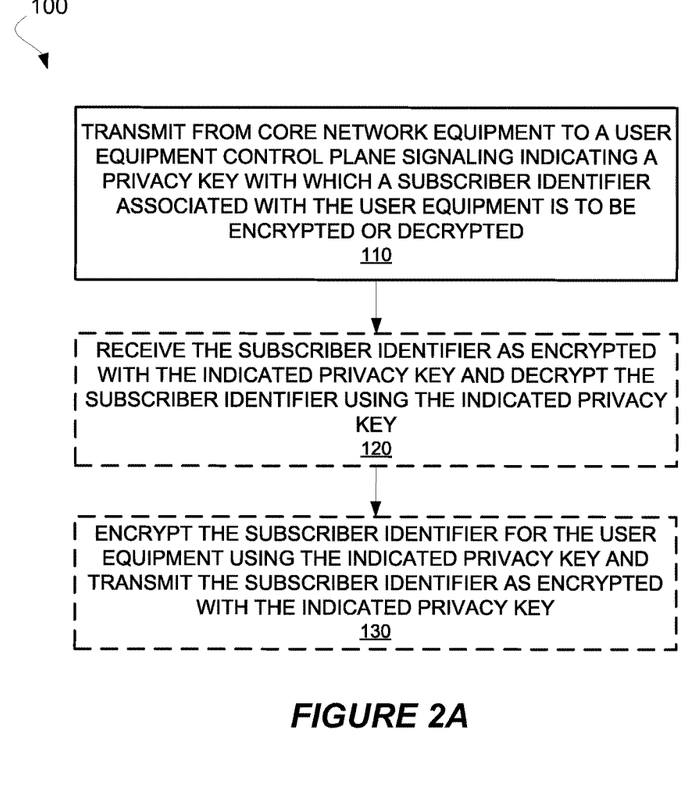
FIG. 2A is a logic flow diagram of a method performed by core network equipment according to some embodiments.

In view of the above modifications as variations, FIG. 2A illustrates a method performed by core network equipment 20 according to some embodiments. As shown, the method 100 includes transmitting from core network equipment 20 to a user equipment 16 control plane signaling 22 indicating a privacy key 24 with which a subscriber identifier associated with the user equipment 16 is to be encrypted or decrypted (Block 110). In some embodiments, the method 100 further includes receiving 24 (e.g., as part of signaling 26 for a procedure such as tracking area update) the subscriber identifier as encrypted with the indicated privacy key and decrypting the subscriber identifier for the user equipment 16 using the indicated privacy key 24 (Block 120). Alternatively or additionally, the method 100 may include encrypting the subscriber identifier for the user equipment 16 using the indicated privacy key and transmitting (e.g., as part of signaling 26 for a procedure such as paging) the subscriber identifier as encrypted with the indicated privacy key (Block 130).

Figure 2B:
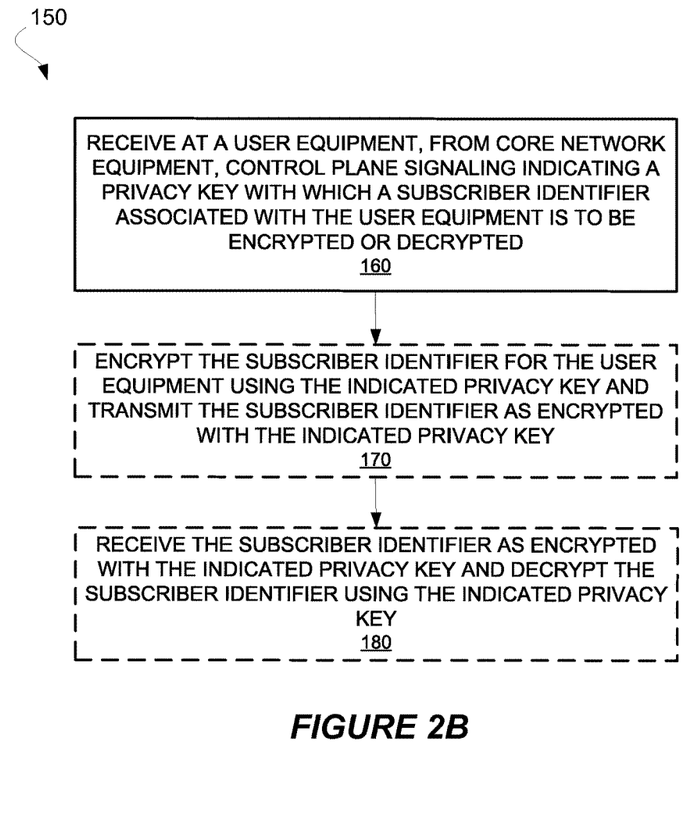
FIG. 2B is a logic flow diagram of a method performed by user equipment, an integrated circuit card, or a subscriber identity module according to some embodiments.

FIG. 2B illustrates a corresponding method performed by user equipment 16 according to some embodiments. As shown, the method 150 includes receiving at the user equipment 16, from core network equipment 20, control plane signaling 22 indicating a privacy key 24 with which a subscriber identifier associated with the user equipment 16 is to be encrypted or decrypted (Block 160). In some embodiments, the method 150 may include encrypting the subscriber identifier for the user equipment 16 using the indicated privacy key 24 and transmitting (e.g., as part of signaling 26 for a procedure such as tracking area update) the subscriber identifier as encrypted with the indicated privacy key (Block 170). Alternatively or additionally, the method 150 further includes receiving (e.g., as part of signaling 26 for a procedure such as paging) the subscriber identifier as encrypted with the indicated privacy key 24 and decrypting the subscriber identifier for the user equipment 16 using the indicated privacy key 24 (Block 180).

Figure 3:
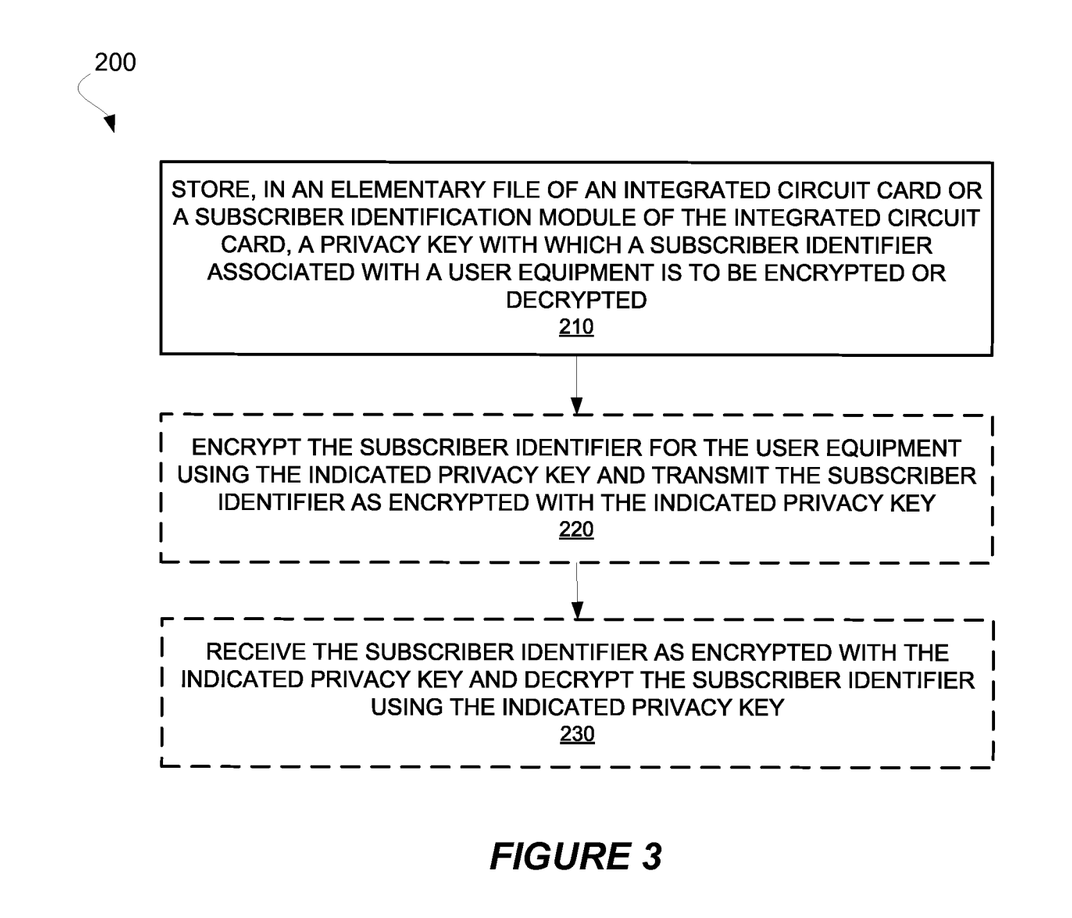
FIG. 3 is a logic flow diagram of a method performed by user equipment, an integrated circuit card, or a subscriber identity module according to other embodiments.

FIG. 3 illustrates a method according to alternative or additional embodiments. The method may be performed by the user equipment 16 (or, more specifically, the ICC 16A or the SIM 16B of the user equipment 16 in some embodiments). As shown, the method 200 includes storing, in an elementary file of an integrated circuit card 16A or a subscriber identification module 16B of the integrated circuit card 16A, a privacy key 24 with which a subscriber identifier associated with a user equipment 16 is to be encrypted or decrypted (Block 210). In some embodiments, the method 150 may include encrypting the subscriber identifier for the user equipment 16 using the privacy key 24 and transmitting (e.g., as part of signaling 26 for a procedure such as tracking area update) the subscriber identifier as encrypted with the privacy key (Block 170). Alternatively or additionally, the method 150 further includes receiving (e.g., as part of signaling 26 for a procedure such as paging) the subscriber identifier as encrypted with the privacy key 24 and decrypting the subscriber identifier for the user equipment 16 using the privacy key 24 (Block 230).

Note that core network equipment 20 herein is any type of node in the CN 14 (e.g., implementing the AMF). A user equipment 16 is any type device capable of communicating with a radio network node over radio signals. A user equipment 16 may therefore refer to a mobile terminal, a wireless device, a machine-to-machine (M2M) device, a machine-type communications (MTC) device, a NB-IoT device, etc. Accordingly, it should be noted that the UE does not necessarily have a "user" in the sense of an individual person owning and/or operating the device. A user equipment 16 may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a user equipment 16 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment 16 as described herein may be comprised in a vehicle and may perform monitoring and/or reporting of the vehicle's operational status or other functions associated with the vehicle.

In some embodiments, the non-access stratum (NAS) is the highest stratum of the control plane between the user equipment 16 and the core network equipment 20 (e.g., implementing an AMF or a mobility management entity, MME) at the radio interface. In some embodiments, the main functions of the protocols that are part of the NAS may include one or more of: the support of mobility of the user equipment (UE) and the support of session management procedures to establish and maintain internet protocol (IP) connectivity between the UE and a packet data network gateway (PDN GW). The NAS control protocol may perform one or more of the following: (i) Evolved Packet System (EPS) bearer management; (ii) Authentication; (iii) ECM-IDLE mobility handling; (iv) Paging origination in ECM-IDLE; (v) Security control.

Note that the core network equipment 20 as described above may perform the processing herein by implementing any functional means or units. In one embodiment, for example, the core network equipment 20 comprises respective circuits configured to perform the steps shown in FIG. 2A. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the core network equipment 20 contains instructions executable by the processing circuitry core network equipment 20 is configured to carry out the processing herein.

Figure 4A:
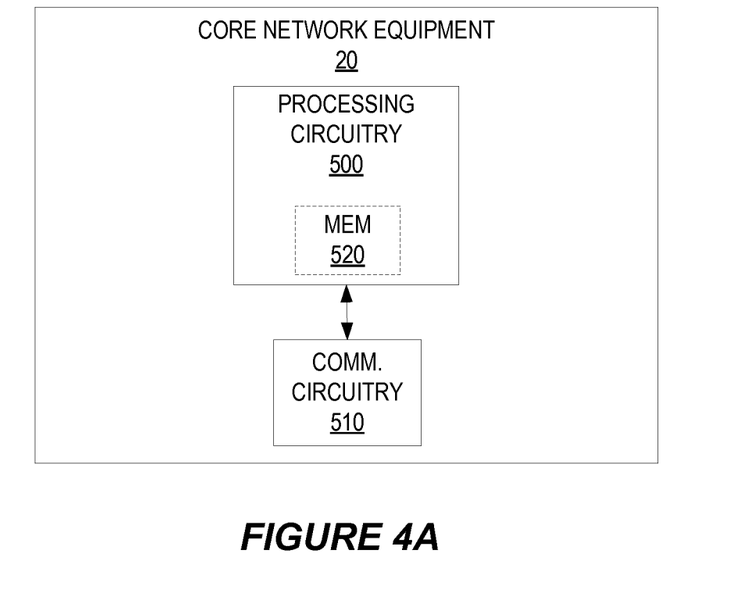
FIG. 4A is a block diagram of core network equipment according to some embodiments.

FIG. 4A illustrates additional details of core network equipment 20 in accordance with one or more embodiments. As shown, the core network equipment 20 includes one or more processing circuits 500 and communication circuitry 510. The communication circuitry 510 is configured to communication with one or more other nodes, e.g., the user equipment 16 and/or a radio network node. The one or more processing circuits 500 are configured to perform processing described above, e.g., in FIG. 2, such as by executing instructions stored in memory 520. The one or more processing circuits 500 in this regard may implement certain functional means or units.

Figure 4B:
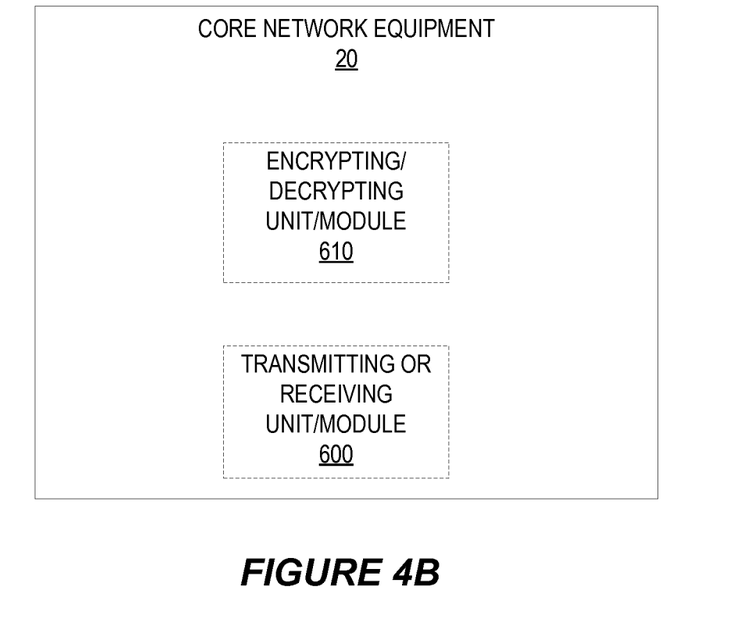
FIG. 4B is a block diagram of core network equipment according to other embodiments.

FIG. 4B in this regard illustrates a core network equipment 20 in accordance with one or more other embodiments. As shown, the core network equipment 20 may include a transmitting or receiving unit or module 600 for performing the transmitting or receiving described above with respect to FIG. 2. Also included may be an encrypting or decrypting unit or module 610 for performing the encrypting and/or decrypting described above. These modules or units may be implemented by the processing circuit(s) 500 of FIG. 4A.

Also, the user equipment 16 may perform the processing herein by implementing any functional means or units. In one embodiment, for example, the user equipment 16 comprises respective circuits configured to perform the steps shown in FIGS. 2B and/or 3. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the user equipment 16 contains instructions executable by the processing circuitry whereby the user equipment 16 is configured to carry out the processing herein.

Figure 5A:
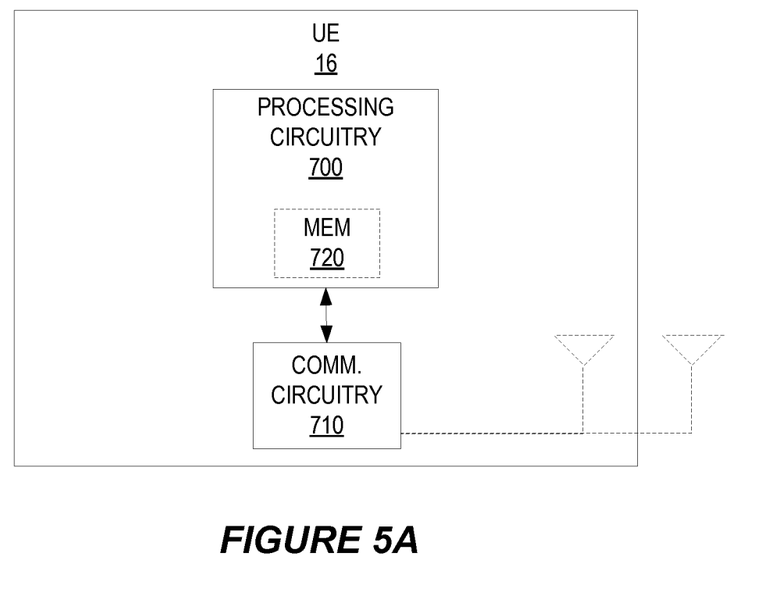
FIG. 5A is a block diagram of user equipment according to some embodiments.

FIG. 5A illustrates additional details of a user equipment 16 in accordance with one or more embodiments. As shown, the user equipment 16 includes one or more processing circuits 700 and communication circuitry 710 (e.g., one or more radio circuits). The communication circuitry 710 may be configured to transmit via one or more antennas. The one or more processing circuits 700 are configured to perform processing described above, e.g., in FIGS. 2B and/or 3, such as by executing instructions stored in memory 720. The one or more processing circuits 700 in this regard may implement certain functional means or units.

Figure 5B:
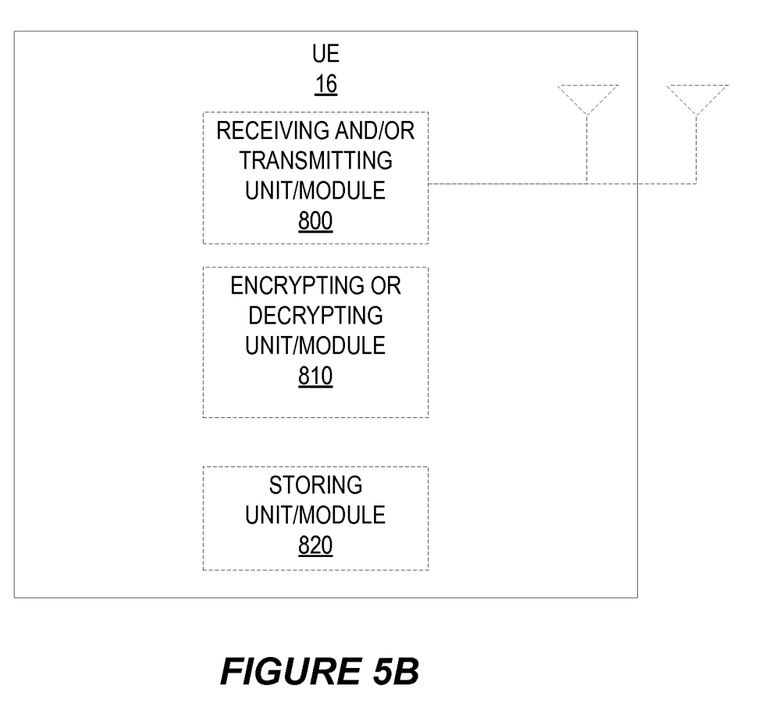
FIG. 5B is a block diagram of user equipment according to other embodiments.

FIG. 5B in this regard illustrates additional details of a user equipment 16 in accordance with one or more other embodiments. As shown, the user equipment 16 may include a receiving and/or transmitting unit or module 800, and/or an encrypting module or unit 810, for performing the transmitting and/or receiving of the control plane signaling 22, and the encrypting and/or decrypting of the subscriber identifier as described above with respect to FIG. 2B. Alternatively or additionally, the user equipment 16 may include a storing module or unit 820 for storing the privacy key as described above with respect to FIG. 3. These units or modules may be implemented by the one or more processing circuits 700 in FIG. 5A.

Furthermore, more specifically in some embodiments the ICC 16A and/or SIM 16B of the user equipment 16 may perform the processing herein by implementing any functional means or units. In one embodiment, for example, the ICC 16A comprises respective circuits configured to perform the steps shown in FIGS. 2B and/or 3. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the ICC 16A contains instructions executable by the processing circuitry whereby the ICC 16A is configured to carry out the processing herein.

Figure 6A:
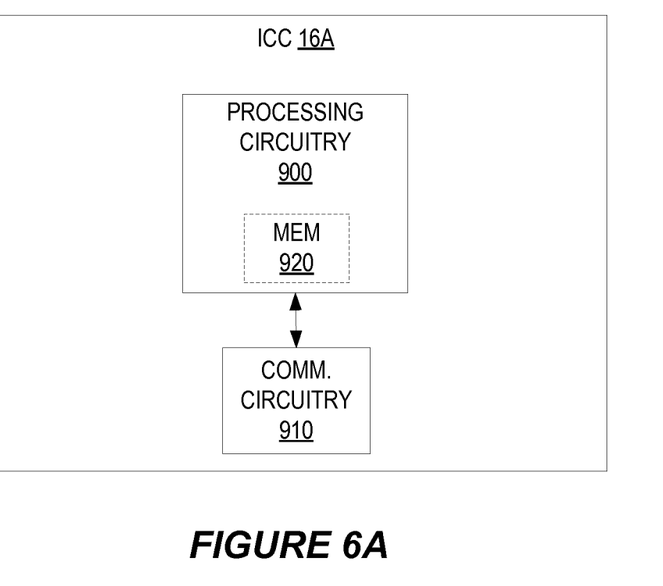
FIG. 6A is a block diagram of an integrated circuit card according to some embodiments.

FIG. 6A illustrates additional details of the ICC 16A in accordance with one or more embodiments. As shown, the ICC 16A includes one or more processing circuits 900 and communication circuitry 910. The communication circuitry 910 may be configured to transmit or receive via one or more interfaces of the user equipment 16. The one or more processing circuits 900 are configured to perform processing described above, e.g., in FIGS. 2B and/or 3, such as by executing instructions stored in memory 920. The one or more processing circuits 900 in this regard may implement certain functional means or units.

Figure 6B:
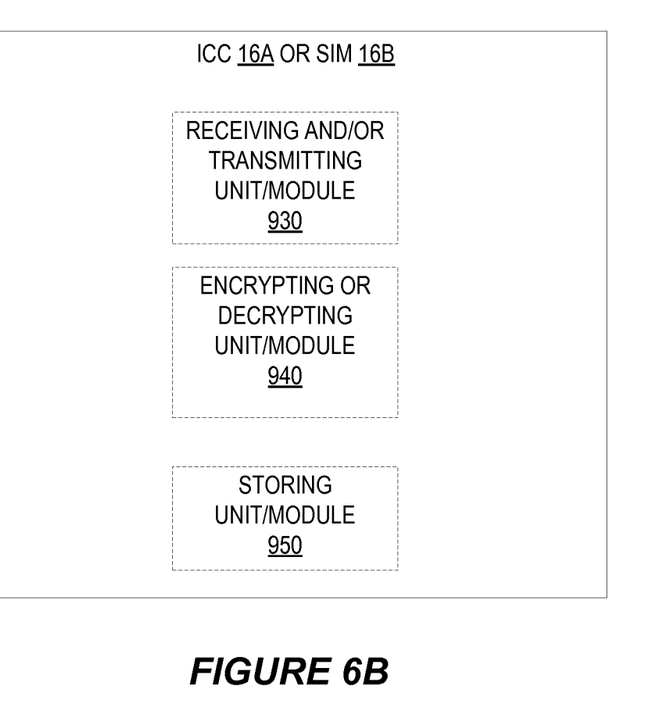
FIG. 6B is a block diagram of an integrated circuit card according to other embodiments.

FIG. 6B in this regard illustrates additional details of the ICC 16A and/or SIM 16B in accordance with one or more other embodiments. As shown, the ICC 16A and/or SIM 16B may include a receiving and/or transmitting unit or module 930, and/or an encrypting module or unit 940, for performing the transmitting and/or receiving of the control plane signaling 22, and the encrypting and/or decrypting of the subscriber identifier as described above with respect to FIG. 2B. Alternatively or additionally, the ICC 16A and/or SIM 16B may include a storing module or unit 950 for storing the privacy key as described above with respect to FIG. 3. These units or modules may be implemented by the one or more processing circuits 900 in FIG. 6A.

Those skilled in the art will also appreciate that embodiments herein further include corresponding computer programs.

A computer program comprises instructions which, when executed on at least one processor of equipment, cause the equipment to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Generally, then, embodiments herein include a method in a wireless communication system. The method comprises transmitting or receiving control plane signaling from core network equipment to a user equipment indicating a privacy key with which a subscriber identifier associated with the user equipment is to be encrypted or decrypted. Where the method is implemented by the core network equipment, for example, the method may comprise transmitting the control plane signaling. Where the method is implemented by the user equipment, by contrast, the method may comprise receiving the control plane signaling.

In some embodiments, the method further comprises encrypting or decrypting the subscriber identifier for the user equipment using the indicated privacy key.

In any of these embodiments, the control plane signaling may be non-access stratum (NAS) signaling.

In any of these embodiments, the privacy key may be indicated by a non-access stratum (NAS) message of the control plane signaling. For example, the NAS message may be a registration accept message that responds to a request for registration with the wireless communication system. Alternatively, the NAS message may be a configuration update command for updating a configuration of the user equipment.

In any of these embodiments, the control plan signaling may provision the user equipment with the privacy key.

In any of these embodiments, the control plane signaling may be signaled according to a security context previously established between the user equipment and the core network equipment.

In any of these embodiments, the control plane signaling may be integrity protected and/or ciphered using a key shared between the user equipment and the core network equipment.

In any of these embodiments, the subscriber identifier may be a long-term subscriber identifier or a permanent subscriber identifier.

In any of these embodiments, the subscriber identifier may be or may be a portion of an International Mobile Subscriber Identity, IMSI. Alternatively, in any of these embodiments, the subscriber identifier may be a pseudonym identifier associated with a long-term subscriber identifier or a permanent subscriber identifier.

In any of these embodiments, the privacy key may be a public key of a home network associated with the subscriber identifier. Alternatively, in any of these embodiments, the privacy key may be a key shared between the user equipment and a home network associated with the subscriber identifier.

In any of these embodiments, transmitting or receiving the control plane signaling may comprise receiving the control plane signaling, and the method may further comprise transmitting acknowledgement information in response acknowledging reception of the control plane signaling.

In any of these embodiments, the control plane signaling may be addressed to an integrated circuit card or a subscriber identification module associated with the subscriber identifier.

In any of these embodiments, transmitting or receiving the control plane signaling may comprise receiving the control plane signaling, and the method may further comprise storing the privacy key in an elementary file of an integrated circuit card or a subscriber identification module associated with the subscriber identifier.

In any of these embodiments, the method may further comprise transmitting or receiving the subscriber identifier as encrypted with the indicated privacy key.

Embodiments herein also include a method comprising storing, in an elementary file of an integrated circuit card or a subscriber identification module of the integrated circuit card, a privacy key with which a subscriber identifier associated with a user equipment is to be encrypted or decrypted.

In some embodiments, the method further comprises encrypting or decrypting the subscriber identifier for the user equipment using the indicated privacy key.

In some embodiments, the method further comprises transmitting or receiving the subscriber identifier as encrypted with the indicated privacy key.

In some embodiments, the subscriber identifier is a long-term subscriber identifier or a permanent subscriber identifier.

In some embodiments, the subscriber identifier is or is a portion of an International Mobile Subscriber Identity, IMSI.

In some embodiments, the subscriber identifier is a pseudonym identifier associated with a long-term subscriber identifier or a permanent subscriber identifier.

In some embodiments, the privacy key is a public key of a home network associated with the subscriber identifier.

In some embodiments, the privacy key is a key shared between the user equipment and a home network associated with the subscriber identifier.

Embodiments also include equipment for use in a wireless communication system. The equipment is configured to transmit or receive control plane signaling from core network equipment to a user equipment indicating a privacy key with which a subscriber identifier associated with the user equipment is to be encrypted or decrypted.

In some embodiments, the equipment is the user equipment. Alternatively, in some embodiments, the equipment is the core network equipment.

The equipment may be configured to perform a method as described in any of the above embodiments.

Embodiments also include equipment for use in a wireless communication system. The equipment comprises processing circuitry and memory, the memory containing instructions executable by the processing circuitry whereby the equipment is configured to transmit or receive control plane signaling from core network equipment to a user equipment indicating a privacy key with which a subscriber identifier associated with the user equipment is to be encrypted or decrypted.

In some embodiments, the equipment is the user equipment. Alternatively, in some embodiments, the equipment is the core network equipment.

In some embodiments, the memory contains instructions executable by the processing circuitry whereby the equipment is configured to perform a method as described in any of the above embodiments.

Embodiments also include equipment for use in a wireless communication system. The equipment comprises a signaling module for transmitting or receiving control plane signaling from core network equipment to a user equipment indicating a privacy key with which a subscriber identifier associated with the user equipment is to be encrypted or decrypted.

In some embodiments, the equipment is the user equipment. Alternatively, in some embodiments, the equipment is the core network equipment.

The equipment may comprise one or more modules for performing a method as described in any of the above embodiments.

Embodiments also include a computer program comprising instructions which, when executed by at least one processor of equipment configured for use in a wireless communication system, causes the equipment to carry out the method of any of the embodiments described above. Embodiments also include a carrier containing the computer program, wherein the carrier is one of an electronic signal, optical signal, radio signal, or computer readable storage medium.

Embodiments also include an integrated circuit card configured to store, in an elementary file of the integrated circuit card or a subscriber identification module of the integrated circuit card, a privacy key with which a subscriber identifier associated with a user equipment is to be encrypted or decrypted.

In some embodiments, the integrated circuit card is configured to perform the method of any of the embodiments described above.

Embodiments also include an integrated circuit card comprising processing circuitry and memory, the memory containing instructions executable by the processing circuitry whereby the equipment is configured to store, in an elementary file of the integrated circuit card or a subscriber identification module of the integrated circuit card, a privacy key with which a subscriber identifier associated with a user equipment is to be encrypted or decrypted.

In some embodiments, the memory containing instructions executable by the processing circuitry whereby the equipment is configured to perform the method of any of the embodiments described above.

Embodiments also include an integrated circuit card comprising a storing module for storing, in an elementary file of the integrated circuit card or a subscriber identification module of the integrated circuit card, a privacy key with which a subscriber identifier associated with a user equipment is to be encrypted or decrypted.

In some embodiments, the integrated circuit card comprises one or more modules for performing the method of any of the embodiments described above.

Embodiments also include a computer program comprising instructions which, when executed by at least one processor of an integrated circuit card, causes the integrated circuit card to carry out the method of any of the embodiments described above. Embodiments further include a carrier containing the computer program, wherein the carrier is one of an electronic signal, optical signal, radio signal, or computer readable storage medium.

Other embodiments will now be described with respect to certain contexts. These embodiments are combinable with and expound upon embodiments above.

In more detail, IMSI catchers are a large privacy problem for legacy radio networks such as Global System for Mobile Communications (GSM), the Universal Mobile Telecommunications System (UMTS), and Long Term Evolution (LTE). The main problem is that the permanent identifier of a subscription, the IMSI, is sent in cleartext over the air interface. For 5G, the aim is to provide a better privacy solution and to avoid sending the permanent identifier (e.g., IMSI) in cleartext over the air.

Several solutions aim to solve this issue. For example, some solutions propose to encrypt the permanent identifier with the public key of the home network. In some embodiments, for example, the UE and the home public land mobile network (PLMN) share a long-term identifier (IMSI) and a long-term key (K). The public key ($PK_H$) of the home PLMN is also available in the UE. There is no need for a global PKI. Instead, the home PLMN may pre-provision the $PK_H$ in the UE or use over-the-air (OTA) to distribute the $PK_H$.

During an initial attach, the UE encrypts its long-term identifier (IMSI) with the public key ($PK_H$) of the home PLMN and sends the encrypted IMSI ($IMSI_{Enc}$) to a serving PLMN. When the UE initiates an attach, it is necessary that the serving PLMN is able to identify the home PLMN of the UE. Therefore, the UE encrypts only the MSIN part of the IMSI while leaving in plain-text the MCC and the MNC part. The encryption needs to have randomization property, since otherwise every encryption would look the same and an attacker could tell that two encrypted identifiers conceal the same long-term identifier.

The home PLMN decrypts the $MSIN_{Enc}$ part of the $IMSI_{Enc}$ using the corresponding private key $SK_H$, and identifies the IMSI. The home PLMN is therefore able to fetch the corresponding security credentials to be used in the authentication procedure. Either the home PLMN or the serving PLMN may authenticate the UE.

The message size for transferring the $IMSI_{Enc}$ is larger than for the plain-text IMSI because of public key encryption. Therefore, after the UE is authenticated, the home PLMN assigns a pseudo IMSI ($IMSI_{Pseudo}$) to the UE, the $IMSI_{Pseudo}$ having the same length and format as the IMSI. In order to save the radio resources in attach procedures, the UE uses the $IMSI_{Enc}$ only when the valid $IMSI_{Pseudo}$ is not available. The $IMSI_{Pseudo}$ may be transferred encrypted (e.g. using a shared key resulting from public-key encryption, or using a key derived from K) between the home PLMN and the UE. However, if a solution is used to reveal the IMSI to the serving PLMN, then $IMSI_{Pseudo}$ could be revealed as well in the similar fashion so that the serving PLMN sends the $IMSI_{Pseudo}$ in a protected message to the UE. There is no privacy breach in doing so because the serving PLMN already knows the IMSI.

The serving PLMN sends the $IMSI_{Pseudo}$ to the UE in a separate protected message or piggy-backed to an existing protected message (e.g. in an NAS Attach Accept message in the current LTE system sent by a MME to a UE). During the $IMSI_{Pseudo}$ assignment, the $IMSI_{Pseudo}$ need not contain the MCC and the MNC, because they are already known from the IMSI.

Under these embodiments, the UE only needs to store one public key associated with the home PLMN. This is significantly different than requiring the UE to store the public key of all potential serving PLMNs it may roam into, or having to distribute those keys when needed. There is no need for a global public key infrastructure (PKI). Instead the home PLMN operator can configure or revoke its public key in the UE, e.g., using OTA.

In another example, a way is provided to conceal the IMSI using public key encryption based on Elliptic Curve Integrated Encryption Scheme (ECIES). The encryption function in the ECIES is symmetric; however, the key used in the encryption is generated using the Elliptic Curve Cryptography (ECC) public/private key pairs of the communicating parties.

As another example, a different solution proposes to use pseudonyms which are sent to the UE encrypted with a key shared between the home network and UE. More particularly, this solution presents a way to provide identifier privacy during the attach procedure in the NextGen system. For the attach to the network, a UE presents a short-lived identifier to the network instead of IMSI used in LTE or UMTS systems. The short-lived identifier, named "Privacy enhanced Mobile Subscriber identifier" (PMSI), is used during an attach, and if the attach procedure includes an authentication and is successfully completed, the UE and network (i.e., HSS or equivalent function in the NextGen system) update the PMSI with a new one that would be used for the next attach in a secure way.

In more detail, a NextGen UE is provisioned with an IMSI and an initial PMSI associated with its subscription by the operator. The PMSI has the same format as IMSI so that a serving network is able to determine the home PLMN based on the first 5 or 6 digits of the PMSI. The solution is described assuming that the control plane of the core network (CP-CN) and the security anchor function (SEAF) are co-located. It is also assumed that $K_{ASME}$ is the name of the key provided in the authentication vector (AV).

When the UE attaches to the network, the UE provides its PMSI in the attach request. When a CP-CN/SEAF receives the attach request from the UE, it sends an authentication information request including PMSI to the authentication server function (AUSF). Upon receiving the authentication information request, the AUSF retrieves the PMSI from the request and identifies the corresponding IMSI associated with the PMSI. Based on the identified IMSI, the AUSF prepares an authentication vector as in LTE. In addition to the authentication vector, the AUSF selects (or derives) a next PMSI that would be used for the next attach by the UE. In some embodiments, for example, the next PMSI (i.e., PMSI_next) is derived from the PMSI received from the CP-CN/SEAF as PMSI_next=MCC|MNC|Truncate-x(F1 ($K_{PMSI}$, PMSI)) where F1 is a PMSI derivation function, e.g., HMAC-SHA-256, $K_{PMSI}$ is a PMSI generation key, MCC is the mobile country code and MNC is the mode network code, and Truncate-x is a function that truncates the input to x bits (e.g., by taking the first x bits of the input).

The next PMSI is encrypted using a shared key with the UE and included in the authentication information response message for the CP-CN/SEAF. For example, the PMSI_next and index pair may be encrypted using a key (AK2) that is only known to the UE and AUSF. This key may be derived based on $K_{PMSI}$ as AK2=KDF($K_{PMSI}$, RAND) where KDF is a key derivation function and RAND is a random number. The same RAND used for deriving AUTN in AV may be used for the key derivation.

The CP-CN/SEAF forwards the encrypted PMSI to the UE in the NAS authentication request message. In embodiments based on AK2, the UE derives the AK2 in the same way as in the AUSF. Using the AK2, the UE decrypts the PMSI_next and index pair and verifies the PMSI_next by deriving it in the same way as in the AUSF.

If the authentication with the CP-CN/SEAF is completed successfully, the UE acknowledges the receipt of the next PMSI to the AUSF. The CP-CN/SEAF in the serving network can request the IMSI associated with the PMSI when it is required.

When a UE attaches to a network, if it does not have a PMSI, the UE triggers a PMSI initialization procedure as follows. The UE performs a PMSI initialization procedure by sending PMSI initialization indication to the network during the attach (using an IMSI). Upon receipt of authentication information request by the serving network with the PMSI initialization indication, the AUSF prepares authentication vector (AV) as normal, but derives two keys from the $K_{ASME}$ in the AV: $K_{PMSI}'$=KDF($K_{ASME}$, "PMSI generation key derivation") and $K_{ASME}'$=KDF($K_{ASME}$, "$K_{ASME}$ derivation during PMSI initialization") where KDF is a key derivation function, e.g., HMAC-SHA-256. Then, $K_{ASME}$ in the authentication vector is set to $K_{ASME}'$. $K_{PMSI}'$ is used to encrypt the $K_{PMSI}$, PMSI and PMSI index that are initialized to the UE. The AUSF includes the encrypted $K_{PMSI}$, PMSI, and PMSI index in the PMSI initialization information element and sends the PMSI initialization information element to the UE as a part of the authentication information response. Then, $K_{ASME}$ in the authentication vector is set to $K_{ASME}'$. $K_{PMSI}'$ is used to encrypt the $K_{PMSI}$, PMSI and PMSI index that are initialized to the UE. Upon receipt of NAS authentication request from the network, the UE performs the following. The UE derives $K_{PMSI}'$ and $K_{ASME}'$ form $K_{ASME}$ as done by the AUSF. The UE uses $K_{ASME}'$ for $K_{ASME}$. The UE obtains $K_{PMSI}$, PMSI and PMSI index by decrypting the received message from AUSF using $K_{PMSI}'$.

No matter the particular solution, what several of the solutions have in common is that the UE needs to know a key that is used to encrypt an identifier which in turn is used for a privacy solution for concealing the permanent subscriber identifier (e.g., IMSI). Such a key is called a privacy key herein.

A challenge exists with regard to how the privacy key is stored in the UE, and/or how the privacy key is provisioned to the UE (e.g., if it is not included at manufacturing).

According to some embodiments herein, a UE obtains and/or stores a privacy key that can be used in a privacy solution for concealing the permanent subscriber identifier (e.g., IMSI). In one or more embodiments, the privacy key is stored in an elementary file of the USIM/UICC. Alternatively or additionally, the privacy key in some embodiments is provisioned to the USIM/UICC by a NAS message (e.g. REGISTRATION ACCEPT) sent from the network to the UE. These embodiments may be used independently of each other.

Figure 7:
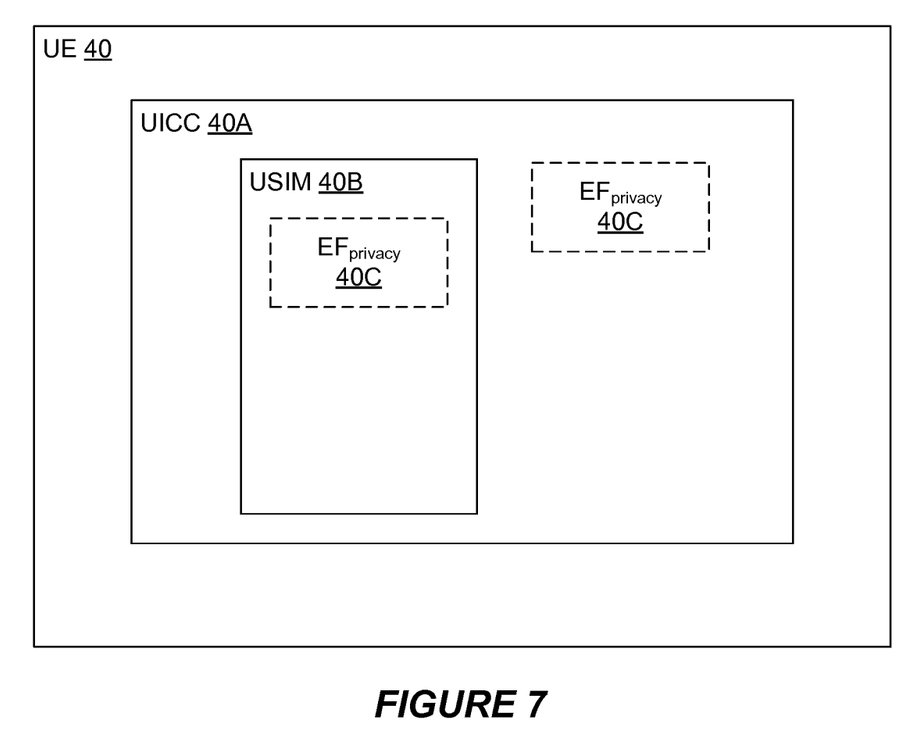
FIG. 7 is a block diagram of a user equipment with a universal integrated circuit card (UICC) and a universal subscriber identity module (USIM) according to some embodiments.

As shown in FIG. 7, for example, a UE 40 contains the UICC 40A, and the UICC platform contains the USIM application 40B. Some embodiments store the privacy key in a new EF (elementary file) 40C, which is called $EF_{privacy}$ here. The EF 40C may for instance be separate from the EF used to store the IMSI and/or may be dedicated for storing the privacy key. The $EF_{privacy}$ can be stored either in the UICC Shared File System, or in the USIM application.

Figure 8:
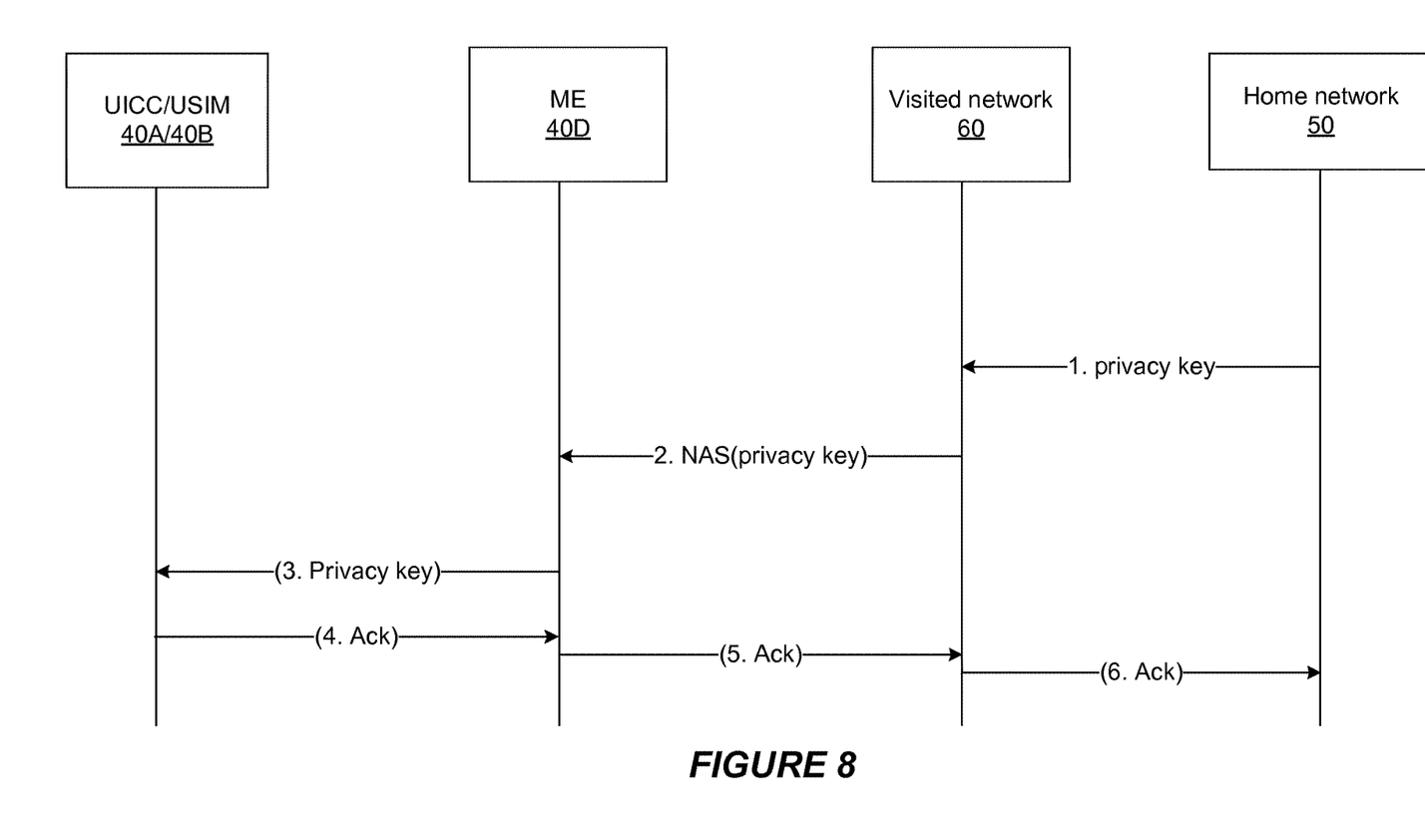
FIG. 8 is a call flow diagram of a procedure for provisioning a UICC/USIM with a privacy key according to some embodiments.

Alternatively or additionally, as shown in FIG. 8, the home network 50 according to some embodiments sends the privacy key to the visited network 60 (Step 1).

The visited network 60 in turn sends the privacy key to the user equipment 40, or more specifically to the mobile equipment 40D of the user equipment 40, in a NAS message (Step 2). For example, the NAS message may be a REGISTRATION ACCEPT message. In this regard, a UE needs to register with the network to get authorised to receive services, to enable mobility tracking and to enable reachability. The Registration procedure is used when the UE needs to perform initial registration to the 5G system, mobility registration update upon changing to a new Tracking area (TA) outside the UE's registration area in idle mode, when the UE performs a periodic registration update (due to a predefined time period of inactivity), and additionally when the UE needs to update its capabilities or protocol parameters that are negotiated in Registration procedure. The AMF sends a Registration Accept message to the UE indicating that the registration has been accepted.

Alternatively, the NAS message may be a UE CONFIGURATION UPDATE command. A UE configuration update procedure is used when AMF wants to change the UE configuration. AMF determines the necessity of UE configuration change due to various reasons (e.g. UE mobility change, network policy, UE subscription change). The AMF sends UE Configuration Update command containing UE parameter(s) to UE.

The REGISTRATION ACCEPT and UE CONFIGURATION UPDATE messages are examples for 5G NAS messages that could be used. However, also 4G (EPC/LTE) NAS messages could be used, as well as NAS messages of possible future systems. The NAS message may contain routing information such that the UICC 40A or active USIM (or a specific USIM) 40B is addressed, or the NAS message information element (IE) may be interpreted by the ME 40D and the information is understood to be relevant for the active UICC/USIM.

In some embodiments, with the privacy key sent to the ME 40D, the ME 40D may write the privacy key to the UICC/USIM 40A/40B or in the ME 40D itself (Step 3). Optionally, the ME itself may also store the privacy key in this step Optionally, the UICC/USIM 40A/4B then acknowledges that the privacy key has been received and is now the key to use for privacy (Step 4). Optionally, the ME 40D acknowledges the reception and usage of the privacy key to the visited network 60 (Step 5). Optionally, the visited network 60 acknowledges the reception and usage of the privacy key to the home network 50 (Step 6). After the acknowledgements the new privacy key can be used.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a user equipment in a wireless communication system, the method comprising:
receiving at the user equipment, from core network equipment, a 5G Non-Access Stratum (NAS) message in the form of a Registration Accept including a public key of a home network of the user equipment with which a subscriber identifier associated with the user equipment is to be encrypted by the user equipment;
in response to receiving the Registration Accept, transmitting acknowledgement information acknowledging reception of the Registration Accept;
storing the public key of the home network in an elementary file in a universal subscriber identification module in the user equipment;
encrypting the subscriber identifier for the user equipment using the public key of the home network; and
transmitting the subscriber identifier as encrypted by the public key of the home network.

2. The method of claim 1, wherein Registration Accept is signaled according to a security context previously established between the user equipment and the core network equipment.

3. The method of claim 1, wherein the Registration Accept is integrity protected and/or ciphered using a key shared between the user equipment and the core network equipment.

4. The method of claim 1, wherein the subscriber identifier is a long-term subscriber identifier or a permanent subscriber identifier.

5. The method of claim 1, wherein the subscriber identifier is or is a portion of an International Mobile Subscriber Identity (IMSI).

6. The method of claim 1, wherein the subscriber identifier is a pseudonym identifier associated with a long-term subscriber identifier or a permanent subscriber identifier.

7. User equipment for use in a wireless communication system, the user equipment comprising:
processing circuitry and memory, the memory containing instructions executable by the processing circuitry whereby the user equipment is configured to:
receive at the user equipment, from core network equipment, a 5G Non-Access Stratum (NAS) message in the form of a Registration Accept including a public key of a home network of the user equipment with which public key of the home network a subscriber identifier associated with the user equipment is to be encrypted by the user equipment;
in response to receiving the Registration Accept, transmit acknowledgement information acknowledging reception of the Registration Accept;
store the public key of the home network in an elementary file in a universal subscriber identification module in the user equipment;
encrypt the subscriber identifier for the user equipment using the public key of the home network; and
transmit the subscriber identifier as encrypted by the public key of the home network.

8. The user equipment of claim 7, wherein Registration Accept is signaled according to a security context previously established between the user equipment and the core network equipment.

9. The user equipment of claim 7, wherein the Registration Accept is integrity protected and/or ciphered using a key shared between the user equipment and the core network equipment.

10. The user equipment of claim 7, wherein the subscriber identifier is a long-term subscriber identifier or a permanent subscriber identifier.

11. The user equipment of claim 7, wherein the subscriber identifier is or is a portion of an International Mobile Subscriber Identity (IMSI).

12. The user equipment of claim 7, wherein the subscriber identifier is a pseudonym identifier associated with a long-term subscriber identifier or a permanent subscriber identifier.

* * * * *